United States Patent [19]
Yamaguchi

[11] Patent Number: 5,875,021
[45] Date of Patent: Feb. 23, 1999

[54] METHOD OF ADJUSTING BRIGHTNESS OF PHOTOGRAPHIC PRINT

[75] Inventor: Hiroshi Yamaguchi, Kanagawa-ken, Japan

[73] Assignee: Fuji Photo Film Co., Ltd., Kanagawa-Ken, Japan

[21] Appl. No.: 720,975

[22] Filed: Oct. 16, 1996

[30] Foreign Application Priority Data

Oct. 17, 1995 [JP] Japan ................................. 7-268323

[51] Int. Cl.[6] ............................................. G03B 27/72
[52] U.S. Cl. ............................................. 355/35; 358/518
[58] Field of Search ................................ 382/162, 163, 382/164, 165, 166, 167; 358/455, 457, 458, 459, 460, 461, 518, 521; 355/35, 67, 68, 69, 70, 71

[56] References Cited

U.S. PATENT DOCUMENTS

| | | | |
|---|---|---|---|
| 5,434,649 | 7/1995 | Hasuo et al. | 355/201 |
| 5,477,317 | 12/1995 | Edmunds et al. | 355/326 |
| 5,696,840 | 12/1997 | Usami | 382/167 |
| 5,699,451 | 10/1993 | Birgmeir et al. | 382/167 |
| 5,712,924 | 10/1995 | Fujimoto et al. | 382/165 |
| 5,719,689 | 10/1995 | Terada | 358/529 |

Primary Examiner—Richard Moses
Assistant Examiner—Shival Virmani

[57] ABSTRACT

In a photographic printer, red, green and blue light beams are modulated respectively according to red, green and blue image signals DR, DG and DB each made up of image signal components representing densities of respective picture elements, and a color image is recorded on a color photosensitive material by scanning the photosensitive material with the modulated light beams. Picture elements which are of brightness not higher than a first predetermined brightness close to the shadow or not lower than a second predetermined brightness close to a highlight and are of chroma not higher than a predetermined chroma are detected on the basis of the image signals DR, DG and DB. The image signal components for the detected picture elements which form a continuous region in the image are excluded from the image signals DR, DG and DB, thereby obtaining image signals DR', DG' and DB'. The brightness of the photographic print obtained is adjusted on the basis of the mean of the densities represented by the image signal components of the image signals DR', DG' and DB'.

13 Claims, 4 Drawing Sheets

METHOD OF ADJUSTING BRIGHTNESS OF PHOTOGRAPHIC PRINT

BACKGROUND OF THE INVENTION

1. Field of the Invention

This invention relates to a method of adjusting the brightness of a photographic print in a photographic printer in which a visible image is recorded on a color photosensitive material on the basis of three color image signals obtained by reading out an image recorded on a color film.

2. Description of the Related Art

As disclosed, for instance, in Japanese Unexamined Patent Publication No. 6(1994)-233052, a photographic printer is brown in which red, green and blue image signals, each made up of image signal components representing densities of the color of respective picture elements, are obtained by reading out an image recorded on a color photographic film. Red, green and blue light beams are modulated according to the image signals and a color image is recorded on a color photosensitive material by scanning the photosensitive material with the modulated light beams.

In such a photographic printer, the brightness of a finished print can be easily adjusted by simply carrying out a linear conversion of the image signals. Conventionally, when the brightness of the print is adjusted, a mean density of the image represented by the three color image signals is calculated and the brightness of the print is determined so that the mean density becomes a predetermined printing density (e.g., 0.7 in the optical density).

However when the brightness of a print is determined on the basis of the mean density of the image, there arises a problem that the print cannot be finished in a desirable brightness in the case where the density distribution on the object is statistically inclined or the main object greatly differs from the background in brightness. For example, in the case of an image including therein a large white signboard, the print is finished dark, and in the case of an image where a main object is in counter light, the main object is finished dark.

SUMMARY OF THE INVENTION

In view of the foregoing observations and description, the primary object of the present invention is to provide a method of adjusting the brightness of a photographic print which can finish the print in a desirable brightness even in the case where the density distribution on the object is statistically greatly inclined or the main object greatly differs from the background in brightness.

In a photographic printer in which red, green and blue light beams are modulated respectively according to red, green and blue image signals DR, DG and DB, each made up of image signal components representing densities of the corresponding color of respective picture elements obtained by reading out an image recorded on a color photographic film, and a color image is recorded on a color photosensitive material by scanning the photosensitive material with the modulated light beams, a method of adjusting the brightness of the photographic print obtained in accordance with a first aspect of the present invention comprises the steps of detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components for the detected picture elements and picture elements which form a continuous region in the image together with the detected picture elements and the color differences from the detected picture elements of which are within a predetermined value from the image signals DR, DG and DB, thereby obtaining image signals DR', DG' and DB', and adjusting the brightness of the photographic print on the basis of the mean of the densities represented by the image signal components of the image signals DR', DG' and DB'.

The detected picture elements which are of brightness not higher than a first predetermined brightness close to the shadow and are of chroma not higher than a predetermined chroma, and those which form a continuous region in the image together with the detected picture elements and the color differences from the detected picture elements of which are within a predetermined value are picture elements in a background portion of a stroboscopic image taken on the night. Further the detected picture elements which are of brightness not lower than a second predetermined brightness close to a highlight and are of chroma not higher than a predetermined chroma, and those which form a continuous region in the image together with the detected picture elements and the color differences from the detected picture elements of which are within a predetermined value are picture elements in a background portion of an image taken in counter light.

Accordingly by excluding the image signal components for the detected picture elements and picture elements which form a continuous region in the image together with the detected picture elements and the color differences from the detected picture elements of which are within a predetermined value from the image signals DR, DG and DB, thereby obtaining image signals DR', DG' and DB', and adjusting the brightness of the photographic print on the basis of the mean of the densities represented by the image signal components of the image signals DR', DG' and DB', the brightness of the photographic print is determined without affect by the background portion, whereby the print can be finished in a desirable brightness.

In a photographic printer in which red, green and blue light beams are modulated respectively according to red, green and blue image signals DR, DG and DB each made up of image signal components representing densities of the corresponding color of respective picture elements obtained by reading out an image recorded on a color photographic film, and a color image is recorded on a color photosensitive material by scanning the photosensitive material with the modulated light beams, a method of adjusting the brightness of the photographic print obtained in accordance with a second aspect of the present invention comprising the step of adjusting the brightness of the photographic print on the basis of the mean of the densities represented by the image signal components of the image signals DR, DG and DB, wherein the improvement comprises that when calculating the mean of the densities represented by the image signal components of the image signals DR, DG and DB, the picture elements are divided into a plurality of groups on the basis of the image signals DR, DG and DB so that the picture elements in each group form a continuous region in the image and the color differences among the picture elements in each group are within a predetermined value, and when the number of the picture elements in a group is larger than a predetermined value, weights put on the densities of picture elements in the group to the number by which the number of the picture elements in the group is larger than the predetermined value in calculation of the mean density are reduced.

A group of picture elements which together form a continuous region in the image and the color differences among which are within a predetermined value is for an object which statistically has a large influence on the mean density of the image, e.g., a large sign-board in the scene. When calculating the mean density, the densities for such an object should also be used. However when the object is too large, the value of the mean density is extremely affected by the object and the brightness of the print becomes unsatisfactory.

By reducing the weights put on the densities of picture elements in the group to the number by which the number of the picture elements in the group is larger than the predetermined value, the influence of the large object on the mean density can be reduced, whereby the print can be finished in a desirable brightness.

In a photographic printer in which red, green and blue light beams are modulated respectively according to red, green and blue image signals DR, DG and DB each made up of image signal components representing densities of the corresponding color of respective picture elements obtained by reading out an image recorded on a color photographic film, and a color image is recorded on a color photosensitive material by scanning the photosensitive material with the modulated light beams, a method of adjusting the brightness of the photographic print obtained in accordance with a third aspect of the present invention comprising the step of adjusting the brightness of the photographic print on the basis of the mean of the densities represented by the image signal components of the image signals DR, DG and DB, wherein the improvement comprises that when calculating the mean of the densities represented by the image signal components of the image signals DR, DG and DB, a three-dimensional histogram of densities represented by image signal components of the image signals DR, DG and DB is created, the number of the picture elements included in respective units which are defined by predetermined widths of the image signals DR, DG and DB in the three-dimensional histogram are obtained, and when the number of the picture elements in a unit is larger than a predetermined value, weights put on the densities of picture elements in the unit to the number by which the number of the picture elements in the unit is larger than the predetermined value in calculation of the mean density are reduced.

The picture elements included in a unit in the three-dimensional histogram (the picture elements the values of the image signal components of which fall within a unit) are approximate to one another in the values of the image signal components of the image signals DR, DG and DB. Accordingly, all the picture elements for, for instance, a large sign-board in the scene are basically included in a unit.

By reducing the weights put on the densities of picture elements in the unit to the number by which the number of the picture elements in the unit is larger than the predetermined value, the influence of the large object on the mean density can be reduced, whereby the print can be finished in a desirable brightness as in the method in accordance with the second aspect of the present invention.

In accordance with a fourth aspect of the present invention, there is provided a method of adjusting the brightness of the photographic print which is a combination of the method in accordance with the first aspect of the present invention and the method in accordance with the second aspect of the present invention. That is, in the photographic printer described above, the method in accordance with the fourth aspect of the present invention comprising the steps of detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components for the detected picture elements and picture elements which form a continuous region in the image together with the detected picture elements and the color differences from the detected picture elements of which are within a predetermined value from the image signals DR, DG and DB, thereby obtaining image signals DR', DG' and DB', adjusting the brightness of the photographic print on the basis of the mean of the densities represented by the image signal components of the image signals DR', DG' and DB', and calculating the mean of the densities represented by the image signal components of the image signals DR', DG' and DB' by dividing the picture elements into a plurality of groups on the basis of the image signals DR', DG' and DB' so that the picture elements in each group form a continuous region in the image and the color differences among the picture elements in each group are within a predetermined value, and by reducing weights put on the densities of picture elements in a group, which includes picture elements larger than a predetermined value in number, to the number by which the number of the picture elements in the group is larger than the predetermined value.

In this method, both the effects of the methods of the first and second aspects of the present invention can be obtained. That is, even a stroboscopic image taken on the night, an image taken in counter light and an image having a large object such as a sign-board can all be printed in a desirable brightness.

In accordance with a fifth aspect of the present invention, there is provided a method of adjusting the brightness of the photographic print which is a combination of the method in accordance with the first aspect of the present invention and the method in accordance with the third aspect of the present invention. That is, in the photographic printer described above, the method in accordance with the fourth aspect of the present invention comprising the steps of detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components for the detected picture elements and picture elements which form a continuous region in the image together with the detected picture elements and the color differences from the detected picture elements of which are within a predetermined value from the image signals DR, DG and DB, thereby obtaining image signals DR', DG' and DB', adjusting the brightness of the photographic print on the basis of the mean of the densities represented by the image signal components of the image signals DR', DG' and DB', and calculating the mean of the densities represented by the image signal components of the image signals DR', DG' and DB' by creating a three-dimensional histogram of densities represented by image signal components of the image signals DR', DG' and DB', obtaining the number of the picture elements included in respective units which are defined by predetermined widths of the image signals DR', DG' and DB' in the three-dimensional histogram, and by reducing weights put on the densities of picture elements in a unit, which includes picture elements larger than a predetermined value in number, to the number by which the number of the picture elements in the unit is larger than the predetermined value.

In this method, both the effects of the methods of the first and third aspects of the present invention can be obtained.

DESCRIPTION OF THE PREFERRED EMBODIMENT

Figure 1:
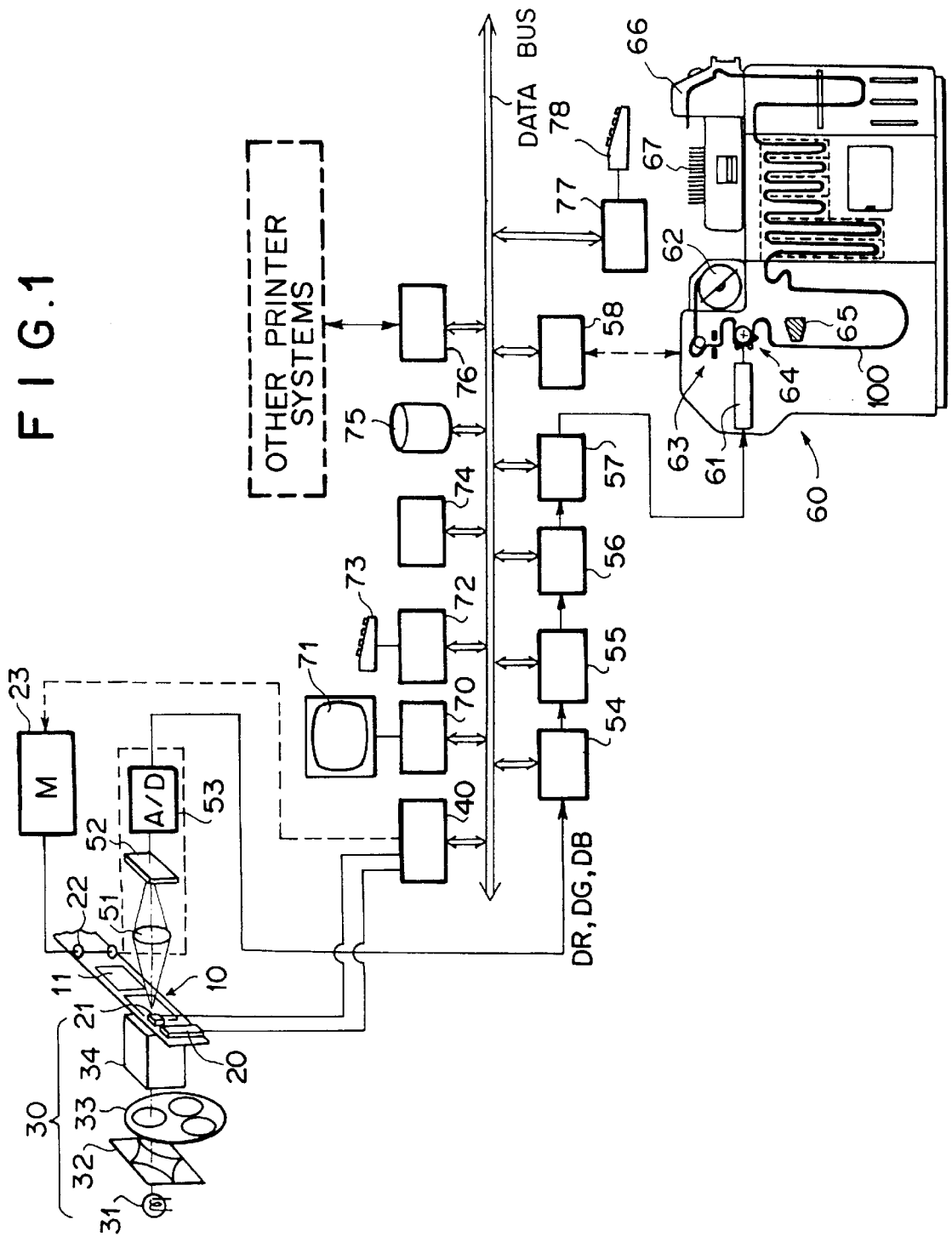
FIG. 1 is a schematic view showing a photographic printer for carrying out the method of the present invention.

In FIG. 1, a digital photographic printer is provided with a scanner 20 which reads out a film number recorded on a check tape applied to an end portion of color film 10, a bar code reader 21 which reads out a bar code for each of the exposures 11 of the film 10, a sprocket 22 which is in mesh with perforations of the film 10 and is rotated to feed the film 10, a motor 23 which drives the sprocket 22, and a film scanner control interface 40 which sends the film number read by the scanner 20 and the exposure number read by the bar code reader 21 to a data bus and outputs a motor control signal to the motor 23.

The photographic printer is further provided with a light source unit 30 which comprises a light source 31 which emits white light, a light control unit 32, a color separation unit 33 and a diffusion box 34 and projects reading light onto the exposures 11 of the film 10, a CCD 52 which photo-electrically reads an image (transmission image) recorded on the exposure 11, onto which the reading light is projected, through a lens 51, an A/D convertor 53 which converts an image signal output from the CCD 52 to a digital image signal, a first image processing system 54 which carries out an image processing on a digital image signal output from the A/D convertor 53 and outputs a processed image signal to a frame memory 55, a second image processing system 56 which carries out, as needed, an image processing with a changed image processing parameter on the processed digital image signal stored in the frame memory 55, and a modulator driver 57 which outputs a modulation signal on the basis of the processed digital image signal.

The photographic printer is further provided with a printer 60 which reproduces a visible image based on the modulation signal output from the modulator driver 57, a printer interface 58, a hard disk 75 which stores the digital image signal stored in the frame memory 55 by way of the data bus, a CRT monitor 71 which reproduces, as needed, a visible image based on the digital image signal and displays image processing conditions and the like, a display interface 70, a keyboard 73 for inputting image processing conditions, correction values for the image processing conditions, an image retrieval information and the like, a keyboard interface 72, a CPU (central processing unit) 74, a communication port 76 which is connected to other digital photographic printer systems through a communication line, a keyboard 78 which is disposed in a check section for checking photographic prints reproduced by the printer 60 and is for inputting, as needed, a reprint instruction and a keyboard interface 77. The CPU 74 carries out mapping of the image retrieval information including the film number and the exposure numbers respectively read by the scanner 20 and the bar code reader 21, the image processing conditions input from the first image processing system 54 and the digital image signal input from the frame memory 55 and then stores them in the hard disk 75. Further the CPU 74 retrieves a digital image signal corresponding to image retrieval information input from the keyboard 73 and controls it, and controls the instruments connected to the data bus.

The printer 60 comprises a printing section, a developing section and a drying section. The printing section comprises a magazine 62 which stores a roll of photographic paper 90 in a continuous length, an exposing light scanner 61 which modulates exposing light according to the modulation signal output from the modulator driver 57 and causing the modulated exposing light to scan the photographic paper 90 in a direction perpendicular to the longitudinal direction of the photographic paper 90 (main scanning), a hole punch unit 63 which punches out reference holes in the photographic paper 90 for positioning the photographic paper 90, a sub-scanning drive system 64 which feeds the photographic paper 90 in the longitudinal direction thereof (sub-scanning) on the basis of the reference holes, and a back printing unit 65 which records the image retrieval information input through the printer control interface 58 on the back side of the photographic paper 90.

The drying section comprises a cutter 66 which cuts the exposed photographic paper 90 exposure by exposure after drying and a sorter 67 which arranges in order the prints thus cut from the exposed photographic paper 90 in a continuous length as well as a normal drying means.

Operation of the digital photographic paper will be described, hereinbelow. The CPU 74 first drives the motor 23 by way of the film scanner control interface 40, thereby feeding the film 10 by way of the sprocket 22. While the film 10 is fed, the film number on the check tape is read by the scanner 20 and input into the CPU 74 and the bar codes representing the number of the exposures 11 are read by the bar code reader 21 and input into the CPU 74 through the film scanner control interface 40.

The exposure 11 whose exposure number represented by the bar code has been read is exposed to light from the light source unit 30 and the image on the exposure 11 is focused on the CCD 52 through the lens 51. The CCD 52 reads the image and the output signal of the CCD 52 is digitized by the A/D convertor 53, whereby a digital image signal made up of digital image signal components for the respective picture elements is obtained.

At this time, red, green and blue filters of the color separation unit 33 are inserted in sequence into the optical path of the light from the light source 31 and the CCD 52 reads the images for the respective filters. Accordingly, three digital image signals DR, DG and DB made up of digital image signal components respectively representing the red, green and blue densities at the respective picture elements are obtained from the A/D convertor 53.

The first image processing system 54 carries out an inversion processing on the digital image signals DR, DG and DB input when they are obtained from a negative and then carries out, on the image signals, an image processing according to a predetermined image processing algorithm so that when a visible image is reproduced on a photographic paper by use of the processed image signals DR, DG and DB, optimal density, gradation and sharpness can be obtained. Then the first image processing system 54 outputs the processed image signals to the frame memory 55.

Strictly speaking, the aforesaid image processing steps are not carried out directly on the digital image signals DR, DG and DB but on the digital image signals DR, DG and DB after being subjected to a gray balance adjustment processing. However the gray balance adjustment processing is not directly concerned with the present invention and accordingly will not be described here.

The image signals input into the frame memory 55 are once stored therein and at the same time are input into the CPU 74 through the data bus, which enables the CPU 74 to optimally adjust the dynamic range of the CCD 52 and the like and optimally adjust the amount of light projected onto the film from the light source unit 30 on the basis of the image signals so that the image read out is optimal in density and gradation.

The image signals stored in the frame memory 55 is input into the CRT monitor 71 through the data bus and a visible image is displayed on the CRT monitor 71 on the basis of the image signals. Then the operator can input through the keyboard 73 correction values for correcting the image processing conditions so that a visible image optimal in density, gradation and color can be obtained.

The correction values input through the keyboard 73 is input into the second image processing system 56. The second image processing system 56 carries out an image processing according to the correction values on the image signals stored in the frame memory 55 and outputs the processed image signals to the modulator driver 57. When the correction is not necessary, the second image processing system 56 outputs the image signals stored in the frame memory 55 as they are to the modulator driver 57.

The printer 60 is controlled by the CPU 74 through the printer control interface 58. That is, the sub-scanning drive system 64 first feeds the photographic paper 90, extending along a predetermined path from the magazine 62, in the sub-scanning direction. The hole punch unit 63 provided on the path of the photographic paper 90 punches out reference holes for synchronization in a side edge portion of the photographic paper 90 at intervals corresponding to, for instance, a length of one photographic print. In the printer 60, the photographic paper 90 is fed with the reference holes used as a reference of synchronization.

The photographic paper 90 is scanned by a light beam which is emitted from the exposing light scanner 61 and is modulated according to the image signals while being fed in the sub-scanning direction, whereby a visible image is recorded on the photographic paper 90 according to the image signals. The speed at which the photographic paper 90 is fed is controlled by the CPU 74 so that the main scanning and the sub-scanning are synchronized with each other.

Thereafter the photographic paper 90 is fed to the developing section from the printing section along a predetermined path. After being developed and washed in the developing section, the photographic paper 90 is fed to the drying section. In the drying section, the photographic paper 90 is dried and cut into prints by the cutter 66.

Figure 2:
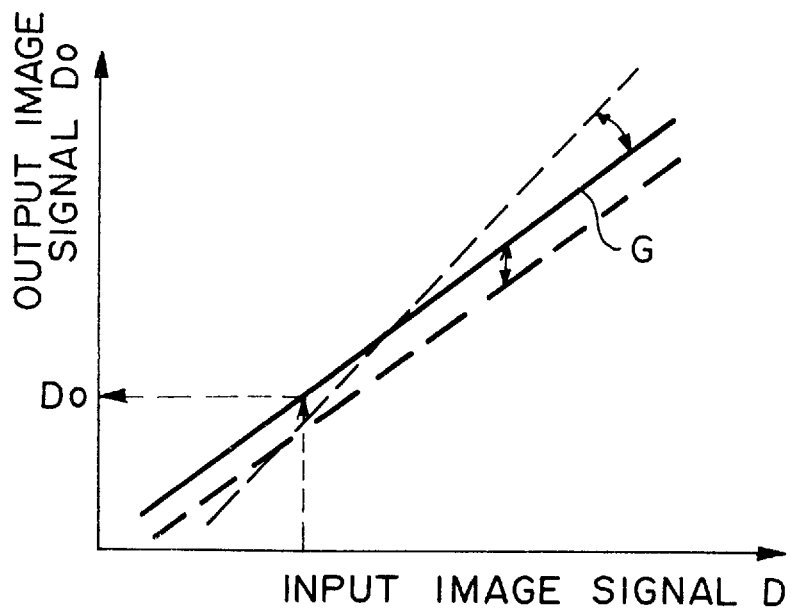
FIG. 2 is a graph for illustrating a gradation processing related to the brightness adjustment of a print in the photographic printer.

A gradation processing which the first image processing system 54 carries out on the digital image signals DR, DG and DB will be described hereinbelow. In the gradation processing, the input digital image signal D (DR, DG or DB) is converted to an output image signal Do, for instance, according to gradation conversion characteristics shown by line G in FIG. 2. By changing the gradation conversion characteristics so that the inclination of line G changes, the overall gradation of the printed image on the photographic paper 90 can be enhanced or weakened. Further when the gradation conversion characteristics are changed so that line G is shifted in the direction of the ordinate axis in FIG. 2, the overall brightness of the printed image on the photographic paper 90 can be adjusted.

The present invention is to make it feasible to set the brightness of the print to be always desirable. The processing for this purpose will be described in detail hereinbelow.

The first image processing system 54 first obtains characteristic values (brightness, hue and chroma) represented by the image signals DR, DG and DB for all the picture elements. The brightness of each picture element is obtained as brightness=(DR+DG+DB)/3.

Figure 3:
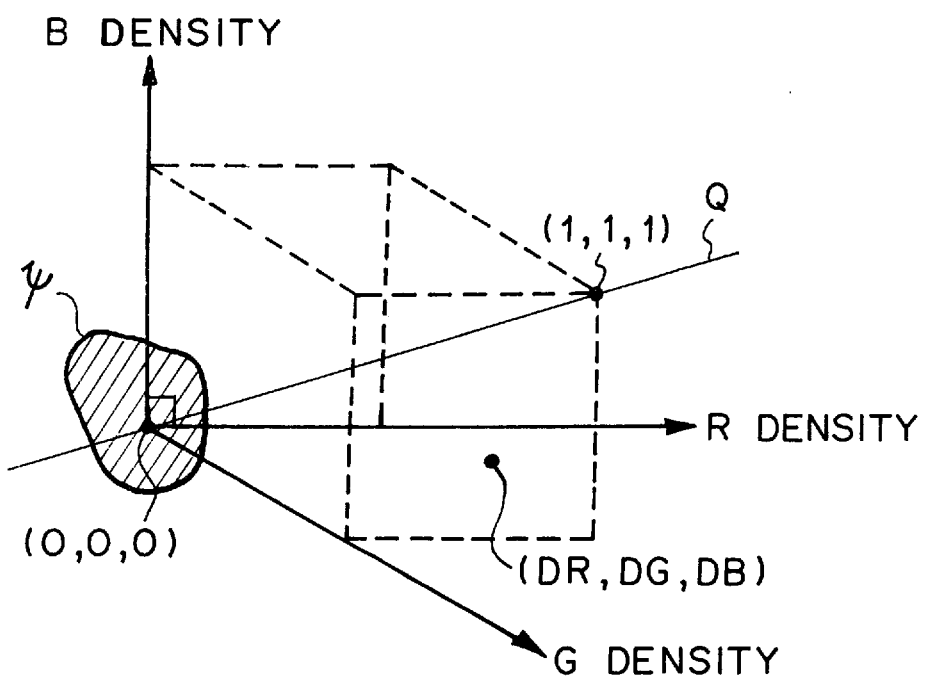
FIG. 3 is a view for illustrating a color difference space employed in the brightness adjustment of a print.
Figure 4:
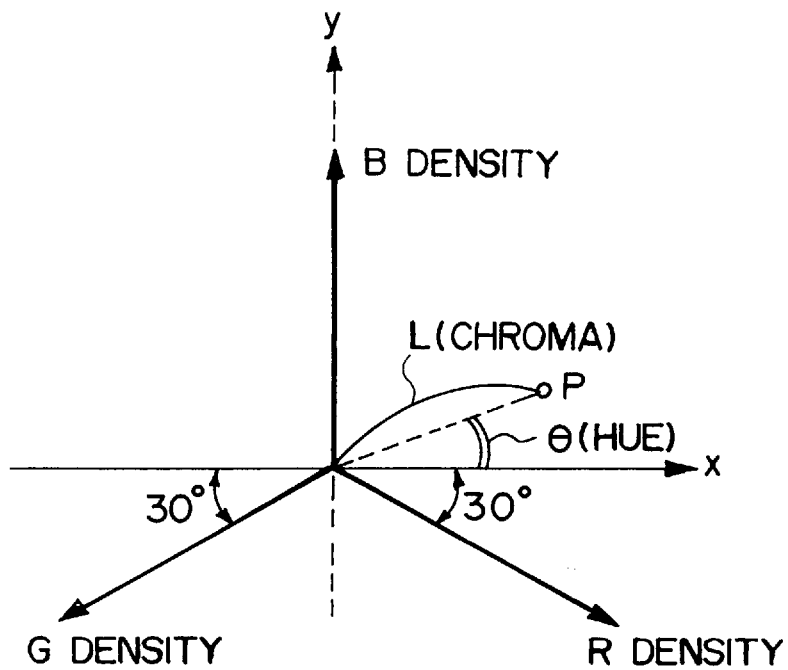
FIG. 4 is a view for illustrating a method of specifying the picture elements for a background employed in the brightness adjustment of a print.

Color information on hue and chroma is defined in the following manner. Considering a RGB density space shown in FIG. 3, all the density points represented by (DR,DG,DB) in the RGB density space are mapped onto a plane $\psi$. The plane $\psi$ is a plane defined by R+G+B=0, that is, the plane which is normal to straight line Q and includes the origin (0,0,0). An x-y coordinate system is set on the color difference plane $\psi$ thus defined, and when the mapping of the density point represented by the image signal components for a given picture element is P, the hue for the picture element is defined by the angle $\theta$ which the straight line passing through the point P and the origin makes to x-axis and the chroma for the picture element is defined by the distance L of the point P from the origin.

Practically it is preferred that a table in which the values of angle $\theta$ and the distance L are related to various combinations of image signal components DR, DG and DB be prepared in advance and the values of angle $\theta$ and the distance L be obtained on the basis of the values of image signal components DR, DG and DB referring to the table.

After the characteristic values (brightness, hue and chroma) represented by the image signals DR, DG and DB are obtained for all the picture elements in this manner, a reference picture element which may be considered to correspond to an especially dark or bright background portion in the scene is specified. For this purpose, the picture elements forming the scene are selected one by one in sequence along a path the same as the path of raster scan and the brightness of each picture element is compared with a first predetermined brightness close to the shadow or a second predetermined brightness close to a highlight and the chroma of each picture element is compared with a predetermined chroma. A picture element whose brightness is not higher than the first predetermined brightness or not lower than the second predetermined brightness and at the same time whose chroma is not higher than the predetermined chroma is adopted as the reference picture element. Then the brightness, hue, chroma and the position of the reference picture element are stored in a memory.

Then taking into account the position of each picture element on the scene, picture elements which may be considered to correspond to the same background portion as the reference picture element are extracted. For this purpose, the color information (hue and chroma) on the eight picture elements adjacent to the reference picture element (horizontally, vertically and obliquely adjacent to the reference picture element) is checked. When the differences in hue and chroma from the reference picture element are both within acceptable ranges, the picture element is considered to correspond to the same background portion as the reference picture element and the position of the picture element is stored in the memory. The brightness of the picture element may be taken into account in addition to the hue and the chroma. That is, the picture element may be considered to correspond to the same background portion as the reference picture element when the difference in hue, chroma and brightness from the reference picture element are all within acceptable ranges.

Then the hue and the chroma of the eight picture elements adjacent to the newly adopted reference picture element are checked. When the differences in hue and chroma from the newly adopted reference picture element are both within the acceptable ranges, the picture element is considered to correspond to the same background portion as the reference picture element and the position of the picture element is stored in the memory.

The processing is repeated until there remains no adjacent picture element whose differences in hue and chroma from the reference picture element are both within the acceptable ranges.

By the processing described above, a group of picture elements forming a continuous background region in the scene is detected. Then in a part of the scene away from the picture element group, the same procedure is effected to detect another group of picture elements forming a continuous background region.

By carrying out the procedure over the entire area of the scene, all the picture elements corresponding to an especially dark or bright background portion in the scene can be extracted, if any.

Then the first image processing system 54 excludes the image signal components for the picture elements corresponding to such a background portion from the image signals DR, DG and DB, thereby obtaining image signals DR', DG' and DB'.

Then the first image processing system 54 divides the picture elements into a plurality of groups on the basis of the image signals DR', DG' and DB' so that the picture elements in each group form a continuous region in the image and the color differences (difference in hue and chroma) among the picture elements in each group are within a predetermined value.

Such picture element groups can be obtained in the manner similar to that for obtaining the background portion picture elements. However in this case, since the reference picture element from which grouping of the picture elements is initiated is not determined on the basis a particular hue or chroma, the initial reference picture element may be the picture element on an extremity of the image and when one picture element group can be specified, a picture element which is outside the group and adjacent to the group may be adopted as a new reference picture element.

Thus the picture elements other than the picture elements corresponding to an especially dark or bright background portion are all divided into a plurality of picture element groups.

Thereafter the first image processing system 54 calculates the mean of the densities represented by the image signal components of the image signals DR', DG' and DB' by use of the picture element groups. For this purpose, the first image processing system 54 first calculates the mean density of each of the picture element groups. This mean density is an arithmetic mean obtained by dividing the sum of the densities of the picture elements in the group by the number of the picture elements in the group. When the picture element groups are numbered as j=1, 2, 3 . . . , and the mean density of the number j picture element group and the number of the picture elements in the number j picture element group are respectively represented by A(j) and N(j), the first image processing system 54 calculates the mean density Ao of the overall image as Ao=$\Sigma$A(j)·{N(j)}/$\Sigma$Ff{N(j)}, wherein F{N} is a function of the number of the picture elements such as shown by the solid line in FIG. 5. The function F{N} takes a value equal to the number N of the picture elements when the number N of the picture elements in a picture element group is not larger than a predetermined value Nc and is fixed to the predetermined value when the number N of the picture elements in the picture element group exceeds the predetermined value Nc.

If the arithmetic mean density Am of the overall image is calculated from the aforesaid means densities A(j) of the picture element groups and the number N(j) of the picture elements in the respective groups, the mean density Am of the overall image is expressed as Am=$\Sigma$A(j)·N(j)/$\Sigma$N(j) and as the number N of the picture elements in a certain picture element group increases, the weight of the mean density of the group on the mean density Am of the overall image increases. To the contrast, when the picture element number limit function F(N) is introduced into calculation of the mean density Ao of the overall image, the mean density A (i.e., the image signal components of the image signals DR', DG' and DB') of the picture elements to the number by which the number of the picture elements in the picture element group is larger than the predetermined value Nc has no weight on calculation of the mean image density Ao.

The first image processing system 54 carries out the aforesaid gradation processing so that the mean image density Ao becomes a predetermined print density (e.g., 0.7 in optical density), thereby determining the brightness of the print. Thus the print can be finished in a desirable brightness without greatly affected by a large object other than the main object.

Further since the mean image density Ao is obtained from the image signal components of the image signals DR', DG' and DB' which do not contain the image signal components for an especially bright or dark background portion, the print can be finished in a desirable brightness without affected by such a background portion.

Figure 5:
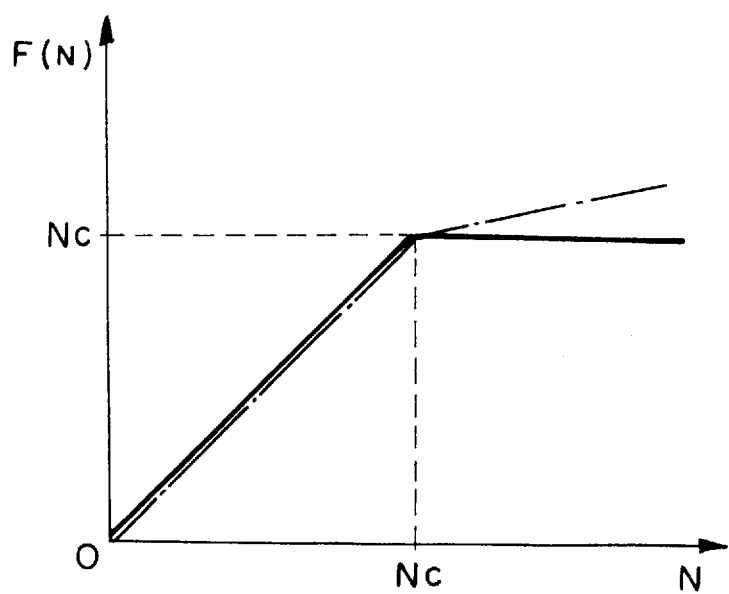
FIG. 5 is a graph for illustrating a picture element number limit function employed in the brightness adjustment of a print.

A picture element number limit function F(N) shown by the chained line in FIG. 5 may be employed in place of that shown by the solid line in FIG. 5. In the picture element number limit function F(N) shown by the chained line, the number of the picture elements by which the number of the picture elements in a picture element group is larger than the predetermined value Nc is considered to be smaller than the actual value. In this case, the mean density A of the picture elements to the number by which the number of the picture elements in the picture element group is larger than the predetermined value Nc has a weight on calculation of the mean image density Ao to some extent.

Another example of the processing for preventing the mean image density Ao, which affects the brightness of the print, from being greatly affected by a large object other than the main object will be described in detail, hereinbelow. Though description will be made on the image signals DR, DG and DB hereinbelow, the processing to be described may be carried out on the image signals DR', DG' and DB' obtained by excluding the image signal components for a background portion from the image signals DR, DG and DB.

Figure 6:
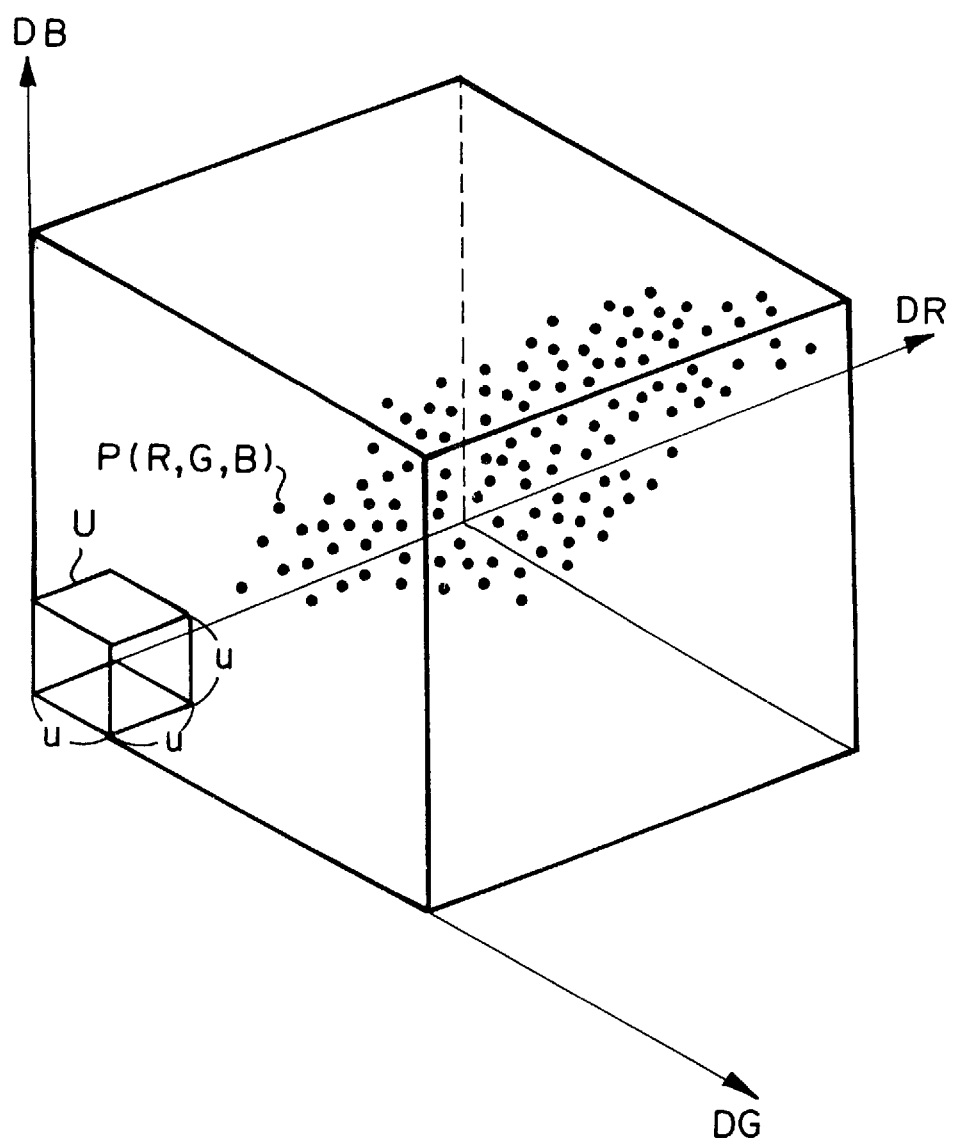
FIG. 6 is a schematic view for illustrating a three-dimensional histogram of the image signals employed in the present invention.

The first image processing system 54 first creates a three-dimensional histogram of the image signal components of the image signals DR, DG and DB. The histogram is obtained by plotting the values of the image signal components of the respective picture elements in a space such as shown in FIG. 6. Point P in FIG. 6 is a point whose values of the image signal components of the image signals DR, DG and DB are R, G and B, respectively.

Then the first image processing system 54 divides the region of the three-dimensional histogram into a plurality of units Uj (J=1, 2, 3 . . . ) defined by widths u of the image signal components DR, DG and DB and calculates the mean density in each unit U. The mean density is an arithmetic mean obtained by dividing the sum of the densities of the picture elements in the unit (the picture elements whose values of the image signal components fall within the unit) by the number of the picture elements in the unit.

When the mean density of the number j unit and the number of the picture elements in the number j unit are respectively represented by A(j) and N(j), the first image processing system 54 calculates the mean density Ao of the overall image as Ao=$\Sigma$A(j)·F{N(j)}/$\Sigma$F{N(j)}, wherein F{N} is a function of the number of the picture elements such as shown by the solid line in FIG. 5.

Accordingly also in this example, the mean density A of the picture elements to the number by which the number of the picture elements in the unit is larger than the predetermined value Nc has no weight on calculation of the mean image density Ao. Accordingly by determining the brightness of the print on the basis of the mean image density Ao thus obtained, the print can be finished in a desirable brightness without affected by a large object other than the main object.

What is claimed is:

1. In a photographic printer in which red, green and blue light beams are modulated respectively according to red, green and blue image signals DR, DG and DB, each made up of image signal components representing densities of the corresponding color of respective picture elements obtained by reading out an image recorded on a color photographic film, and a color image is recorded on a color photosensitive material by scanning the photosensitive material with the modulated light beams, a method of adjusting the brightness of the photographic print obtained comprising the steps of:

detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components for the detected picture elements detected in said step of detecting which form a continuous region in the image from the image signals DR', DG' and DB', and adjusting the brightness of the photographic print on the basis of the mean of the densities represented by the image signal components of the image signals DR', DG' and DB'.

2. In a photographic printer in which red, green and blue light beams are modulated respectively according to red, green and blue image signals DR, DG and DB each made up of image signal components representing densities of the corresponding color of respective picture elements obtained by reading out an image recorded on a color photographic film, and a color image is recorded on a color photosensitive material by scanning the photosensitive material with the modulated light beams.

a method of adjusting the brightness of the photographic print obtained comprising the step of:

adjusting the brightness of the photographic print on the basis of the mean of the densities represented by the image signal components of the image signals DR, DG and DB, said step of adjusting including, when calculating the mean of the densities represented by the image signal components of the image signals DR, DC and DB, the picture elements are divided into a plurality of groups on the basis of the image signals DR, DG and DB so that the picture elements in each group form a continuous region in the image and the color differences among the picture elements in each group are within a predetermined value, and when the number of the picture elements in a group is larger than a predetermined value, weights put on the densities of picture elements in the group and used in the calculation of mean density which exceed a predetermined number of the picture elements in the group are reduced.

3. In a photographic printer in which red, green and blue light beams are modulated respectively according to red, green and blue image signals DR, DG and DB each made up of image signal components representing densities of the corresponding color of respective picture elements obtained by reading out an image recorded on a color photographic film, and a color image is recorded on a color photosensitive material by scanning the photosensitive material with the modulated light beams, a method of adjusting the brightness of the photographic print obtained comprising the step of:

adjusting the brightness of the photographic print on the basis of the mean of the densities represented by the image signal components of the image signals DR, DG and DB, said step of adjusting including, when calculating the mean of the densities represented by the image signal components of the image signals DR, DG and DB, a three-dimensional histogram of densities represented by image signal components of the image signals DR, DG and DB is created, the number of the picture elements included in the respective units which are defined by predetermined widths of the image signals DR, DG and DB in the three-dimensional histogram are obtained, and when the number of picture elements in a unit is larger than a predetermined number, picture elements in the unit which exceed the predetermined number during calculation of the mean density have the weight of their density values reduced.

4. In a photographic printer in which red, green and blue light beams are modulated light beams, a method of adjusting the brightness of the photographic print obtained comprising the steps of:

detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components for the detected picture elements detected in said step of detecting which form a continuous region in the image from the image signals DR, DG and DB, thereby obtaining image signals DR', DG' and DB', adjusting the brightness of the photographic print on the basis of the mean of the densities represented by the image signal components of the image signals DR', DG' and DB', and calculating the mean of the densities represented by the image signal components of the image signals DR', DG' and DB' by dividing the picture elements into a plurality of groups on the basis of the image signals DR', DG' and DB' so that the picture elements in each group form a continuous region in the image and the color differences among the picture elements in each group are within a predetermined value, and by reducing weights put on the densities of picture elements in a group, which includes picture elements larger than a predetermined value in number, to the number by which the number of the picture elements in the group is larger than the predetermined value.

5. In a photographic printer in which red, green and blue light beams are modulated respectively according to red, green and blue image signals DR, DG and DB each made up of image signal components representing densities of the corresponding color of respective picture elements obtained by reading out an image recorded on a color photographic film, and a color image is recorded on a color photosensitive material by scanning the photosensitive material with the modulated light beams, a method of adjusting the brightness of the photographic print obtained comprising the steps of:

detecting, on a basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components for the detected picture elements detected in said step of detecting which form a continuous region in the image from the image signals DR', DG' and DB', adjusting the brightness of the photographic print on the basis of the mean of the densities represented by the image signal components of the image signals DR', DG' and DB', and calculating the mean of the densities represented by the image signal components of the image signals DR', DG' and DB' by creating a three-dimensional histogram of densities represented by image signal components of the image signals Dr', DG' and DB', obtaining the number of the picture elements included in respective units which are defined by predetermined widths of the image signals DR', DG' and DB' in the three-dimensional histogram, and by reducing weights put on the densities of picture elements in a unit, which includes picture elements larger than a predetermined value in number, to the number by which the number of the picture elements in the unit is larger than the predetermined value.

6. In a photographic printer in which an image signal is used to produce a color image by supplying light modulated by the image signal to a photosensitive material to record the image thereon to form a photographic print, a method of adjusting the brightness of the photographic print comprising the steps of:

a) identifying portions of the image signal which have a brightness not higher than a first predetermined brightness close to shadow and not lower that a second predetermined brightness close to a highlight and having a chroma value not higher than a predetermined chroma value;

b) excluding the identified portions of the image signal of step a) from the image signal to produce a modified image signal;

c) determining the weighed brightness of the modified image signal; and d) adjusting the brightness of the photographic print on the basis of the weighed brightness of the modified signal determined in said step c).

7. In a photographic printer in which an image signal is used to produce a color image by supplying light modulated by the image signal to a photosensitive material to record the image thereon to form a photographic print, a method of adjusting the brightness of the photographic print comprising the steps of:

a) identifying those portions of the image signal which have image data points having brightness and chroma values within a predetermined range;

b) determining the weighed brightness of the modified image signal while adjusting the weight of each of said portions of the image signal which exceed a predetermined area of the image; and c) adjusting the brightness of the photographic print on the basis of the weighed brightness of the modified signal determined in said step c).

8. The method of claim 7 wherein said step b) of determining calculates a weighted average density of the image signal.

9. The method of claim 7 wherein said step b) of determining reduces the weight of each of said portions of said image signal which exceed the predetermined area.

10. The method of claim 8 wherein said step b) of determining uses a three dimensional histogram of color signals Dr, Dg, and Db to produce a three dimensional density bin storing a representation of the frequency of occurrence of picture elements having a particular three dimensional density.

11. In a photographic printer in which an image signal is used to produce a color image by supplying light modulated by the image signal to a photosensitive material to record the image thereon to form a photographic print, a method of adjusting the brightness of the photographic print comprising the steps of:

a) assigning each picture element of said image signal to a three dimensional density bin of a three dimensional color histogram identifying the number of image elements in said image signal having the three dimensional color density of each of said three dimensional density bins;

b) reducing the rate of increase of the number representing the number of picture elements in any three dimensional frequency bin in said step a) if a predetermined level is exceeded;

c) determining the weighed brightness of the image signal from said three dimensional histogram as weighed by said step b) of reducing.

12. The method of claim 11 wherein said step b) of reducing limits the number of picture elements accumulated in each bin of the histogram to a predetermined maximum number.

13. The method of claim 11 wherein said step b) of reducing reduces the rate of increase of the number of picture elements accumulated in each bin of the histogram when a predetermined number is reached.

* * * * *